United States Patent
Hamajima et al.

(10) Patent No.: US 7,974,501 B2
(45) Date of Patent: Jul. 5, 2011

(54) OPTICAL MODULATORS

(75) Inventors: Akira Hamajima, Nagoya (JP); Jungo Kondo, Nishikamo-gun (JP); Osamu Mitomi, Sagamihara (JP); Tetsuya Ejiri, Kasugai (JP); Kenji Aoki, Nagoya (JP)

(73) Assignee: NGK Insulators, Ltd., Aichi-Prefecture (JP)

( * ) Notice: Subject to any disclaimer, the term of this patent is extended or adjusted under 35 U.S.C. 154(b) by 286 days.

(21) Appl. No.: 12/407,904

(22) Filed: Mar. 20, 2009

(65) Prior Publication Data

US 2009/0245715 A1    Oct. 1, 2009

(30) Foreign Application Priority Data

Mar. 28, 2008  (JP) ................................ 2008-087285

(51) Int. Cl.
G02B 26/00 (2006.01)
G02F 1/035 (2006.01)

(52) U.S. Cl. ................................ 385/2; 385/14; 359/245

(58) Field of Classification Search .................. 385/1, 2, 385/3, 14, 129, 130, 131; 359/238, 245, 359/251, 315
See application file for complete search history.

(56) References Cited

U.S. PATENT DOCUMENTS

| 5,892,857 | A  | * | 4/1999  | McCallion ........................ 385/1 |
| 6,219,469 | B1 |   | 4/2001  | Minakata et al. |
| 6,556,727 | B2 | * | 4/2003  | Minakata et al. .................. 385/2 |
| 7,290,328 | B2 |   | 11/2007 | Kondo et al. |
| 7,397,974 | B2 | * | 7/2008  | Ichikawa et al. .................. 385/2 |
| 7,856,155 | B2 | * | 12/2010 | Shinriki et al. .................. 385/2 |

FOREIGN PATENT DOCUMENTS

| JP | 10-133159    | A1 | 5/1998 |
| JP | 2003-270600  | A1 | 9/2003 |
| JP | 2005-173162  | A1 | 6/2005 |
| WO | 2008/099950  | A1 | 8/2008 |

OTHER PUBLICATIONS

Takashi Yamada, et al., "Highly Functional Hybrid Modules Using Low Loss Direct Attachment Technique with Planar Lightwave Circuit and LiNbO$_3$ Devices," 10th International Symposium on Microwave and Optical Technology, 2005, pp. 107-110.
U.S. Appl. No. 12/401,753, filed Mar. 11, 2009, Mitomi et al.
U.S. Appl. No. 12/499,921, filed Jun. 9, 2009, Aoki et al.

* cited by examiner

*Primary Examiner* — Akm E Ullah
(74) *Attorney, Agent, or Firm* — Cermak Nakajima LLP; Tomoko Nakajima

(57) ABSTRACT

An optical modulator 24 has a supporting substrate 5, a modulating substrate 11 made of an electro-optical material, an optical waveguide 12 provided on the side of a first main surface 30 of the modulating substrate 11, and an adhesion layer 6 adhering a second main surface 31 of the modulating substrate 11 onto the supporting substrate 5. The modulating substrate 11 has a high-frequency interaction portion 11c applying a voltage on the optical waveguide 12 to modulate propagating light, an incident portion 11a inputting light to the optical waveguide, and an outgoing portion 11b outputting light from the optical waveguide. The high-frequency interaction portion 11c is recessed on the first main surface 30 of the modulating substrate 11 with respect to the incident and outgoing portions 11a and 11b. The high-frequency interaction portion 11c has a thickness smaller than the those of the incident and outgoing portions 11a and 11b.

8 Claims, 12 Drawing Sheets

Results of temperature cycle test of optical insertion loss

Results of temperature cycle test of Extinction Ratio

Spot Size and Coupling Loss

OPTICAL MODULATORS

This application claims the benefit of Japanese Patent Application P2008-87285 filed on Mar. 28, 2008, the entirety of which is incorporated by reference.

TECHNICAL FIELD

The present invention relates to an optical modulator such as a traveling-wave optical modulator.

BACKGROUND ART

In a paper entitled "Highly Functional Hybrid Modules Using Low Loss Direct Attachment Technique with Planar Lightwave Circuit and LiNbO$_3$ Devices" by T. Yamada et al., "ISMOT-2005", pp. 107 to 110, a PLC optical circuit and an LN waveguide device are connected together. And further, Japanese Patent Laid-Open Publication No. 2005-173162A describes connecting a PLC optical circuit and an LN waveguide device together. This patent document describes that since the optical waveguides of the two substrates are different in mode field diameter, a tapered portion for adjusting the difference in the mode field diameter is provided between the substrates.

FIG. 3 of Japanese Patent Laid-Open Publication No. H10-133159A shows a Mach-Zehnder optical modulator in which velocity matching between propagating light and modulated signals is made by forming a recess in the undersurface of optical waveguide substrate. That is, the thickness of the optical waveguide substrate is reduced at a harmonic modulating portion.

Moreover, in Japanese Patent No. 3762320B as well, the description is made that in a device with an optical waveguide substrate adhered onto a supporting substrate, a high-frequency interaction portion is reduced in thickness and an incident portion or an outgoing portion is increased in thickness. In this case as well, a recess is provided on the undersurface side of the high-frequency interaction portion, and the recess is filled with an adhesive.

DISCLOSURE OF THE INVENTION

In WO 2008/099950 A1, the present assignee has disclosed that an optical modulation substrate including a high-frequency interaction portion and a thick passive substrate to be connected to an optical fiber are each formed as an independent component, and then both the substrates are adhered to each other to form an integrated optical modulator.

In the high-frequency interaction portion of such an optical modulator, there is a need to narrow an electrode gap in order to reduce driving voltage. On the other hand, in order to achieve light wave-microwave velocity matching while not only narrowing the electrode gap but also maintaining characteristic impedance matching, there is a need to reduce the thickness of the modulator substrate to not larger than 10 μm, particularly to not larger than 5 μm.

In a case where, for example, a titanium-diffused optical waveguide has been formed on such a very thin lithium niobate substrate, since a mode size in a direction of thickness (vertical direction) of the substrate is limited by the substrate thickness, the modulator is formed in a lengthwise flat shape. On the other hand, the mode field diameter of the optical fiber to be connected is round, and the diameter thereof is about 10 μm. Accordingly, in the case where the optical waveguide formed in the thin lithium niobate substrate is connected to the external optical fiber, the insertion loss is increased.

As described in Japanese Patent Laid-Open Publication No. 10-133159A, Japanese Patent No. 3762320B, and WO 2008/099950 A1, the high-frequency interaction portion is formed with a relatively reduced thickness and the incident portion and the outgoing portion are formed with an increased thickness, so that it is possible to reduce the insertion loss between the incident portion or the outgoing portion and an external optical coupling member. In this case, however, when the optical modulator is subjected to a number of temperature cycles, it has been observed that the insertion loss is increased and the extinction ratio is deteriorated.

An object of the present invention is to reduce the optical insertion loss due to a mismatch in mode field diameters between optical fiber propagating light and optical waveguide propagating light in an optical modulation device, and to prevent an increase in the insertion loss and a deterioration in an extinction ratio even when the device is subjected to temperature cycles.

An optical modulator according to the present invention comprises:

a supporting substrate;

a modulating substrate comprising an electro-optical material;

an optical waveguide provided on the side of a first main surface of the modulating substrate; and an adhesion layer adhering a second main surface of the modulating substrate onto the supporting substrate. The modulating substrate has a high-frequency interaction portion applying a voltage on the optical waveguide to modulate propagating light, an incident portion inputting light to the optical waveguide and an outgoing portion outputting light from the optical waveguide. The high-frequency interaction portion is recessed on the first main surface of the modulating substrate from the incident and outgoing portions, and the thickness of the high-frequency interaction portion is smaller than the thicknesses of the incident and outgoing portions.

In the modulating substrate according to the present invention, since the thickness of the high-frequency interaction portion is smaller than the thicknesses of the incident and outgoing portions, the insertion loss at the time of inputting optical fiber propagating light to the modulator or outputting the light from the modulator can be reduced and velocity matching between propagating light and modulation voltage can be made at the interaction portion.

Up to the present, the high-frequency interaction portion has been thinned by providing a recess on the undersurface side of the optical waveguide substrate. In this case, however, after the device was subjected to a number of temperature cycles, the light insertion loss was sometimes increased and the extinction ratio was sometimes deteriorated. The present inventors have studied the cause of such problems, and have found the following. That is, there is a mismatch between thermal expansion coefficients of the supporting substrate, adhesion layer and modulating substrate, and this mismatch tends to cause stress applied to the totally thin modulating substrate. It is considered that in a case where the high-frequency interaction portion is thinned by providing a recess on the undersurface side of the modulating substrate and the device is subjected to a number of temperature cycles, the light insertion loss and the extinction ratio are deteriorated due to the uneven stress imposed on the modulating substrate.

In contrast, according to the present invention, by providing the recess on the optical waveguide side of the modulating substrate, i.e., on the side opposite to the supporting substrate and the adhesion layer, the thickness of the substrate is reduced at the interaction portion, but is relatively increased at the incident and outgoing portions. From the use of such a structure, it is proved that even after the device is subjected to temperature cycles, an increase in the light insertion loss and a deterioration in the extinction ratio can be suppressed, and thus the invention has been accomplished.

BEST MODE FOR CARRYING OUT THE INVENTION

In the present invention, the term "high-frequency interaction portion" refers to a region where light is modulated by applying a high-frequency voltage on an optical waveguide. The term "high-frequency voltage" as used herein refers to a voltage with a frequency of 1 GHz or higher.

A modulating electrode according to the present invention is not limited to so-called CPW optical modulators, and may be applied to various types of optical modulators. The present invention is applicable to so-called ACPS optical modulators and independent optical modulators, for example.

Figure 1:
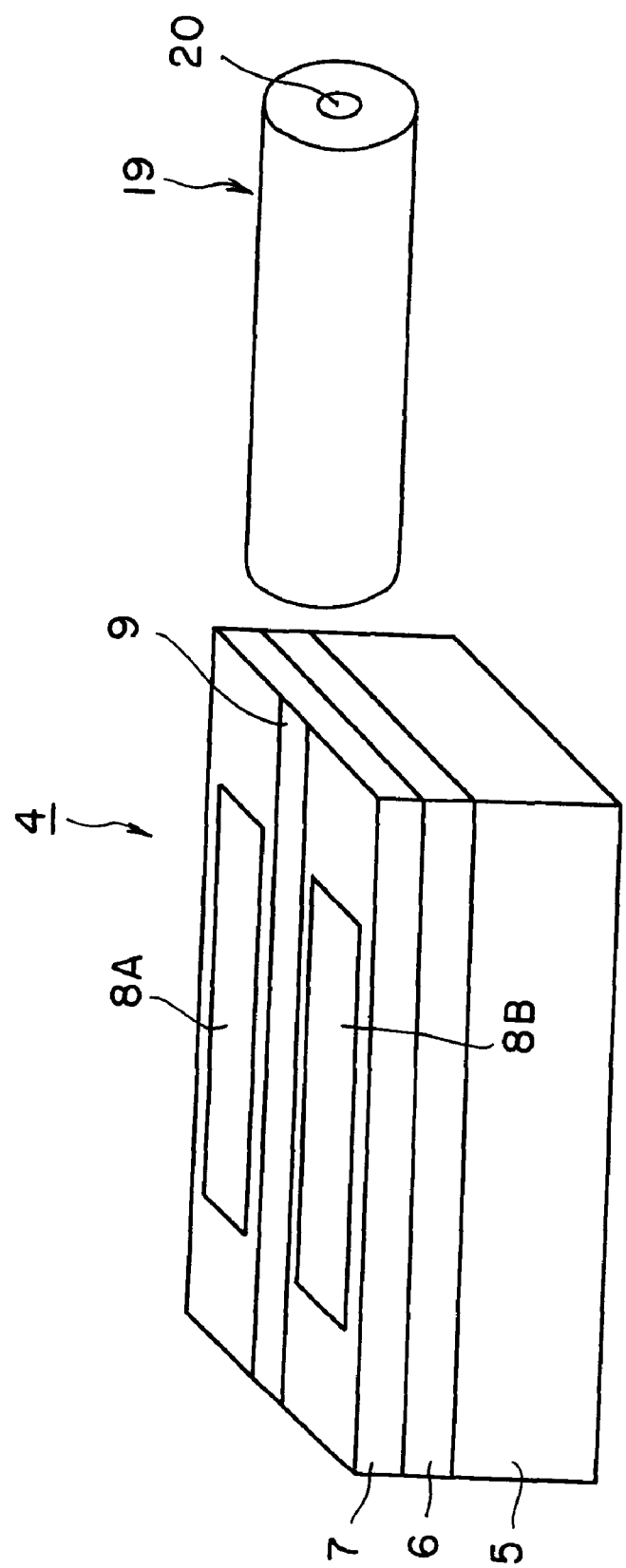
FIG. 1 is a schematic perspective view of an optical modulator 4 according to contrastive example 1.

FIG. 1 is a schematic perspective view of an optical modulator 4 according to contrastive example 1. In this example, a modulating substrate 7 is adhered onto a supporting substrate 5 via an adhesion layer 6. On first main surface of the modulating substrate 7 (a top surface of the substrate 7 in FIG. 1), a straight optical waveguide 9 and a pair of modulating electrodes 8A and 8B are formed, for example. Toward an incident end surface of the optical waveguide 9, a core 20 of an optical fiber 19 is optically coupled. Likewise, toward an outgoing surface of the optical waveguide 9 as well, the core 20 of the optical fiber 19 is optically coupled.

However, in the optical modulator according to contrastive example 1, since the thickness of the modulating substrate 7 is constant, for example at 10 μm or smaller, the light insertion loss caused between the optical modulator and the optical fiber tends to increase when velocity matching is performed.

Figure 2:
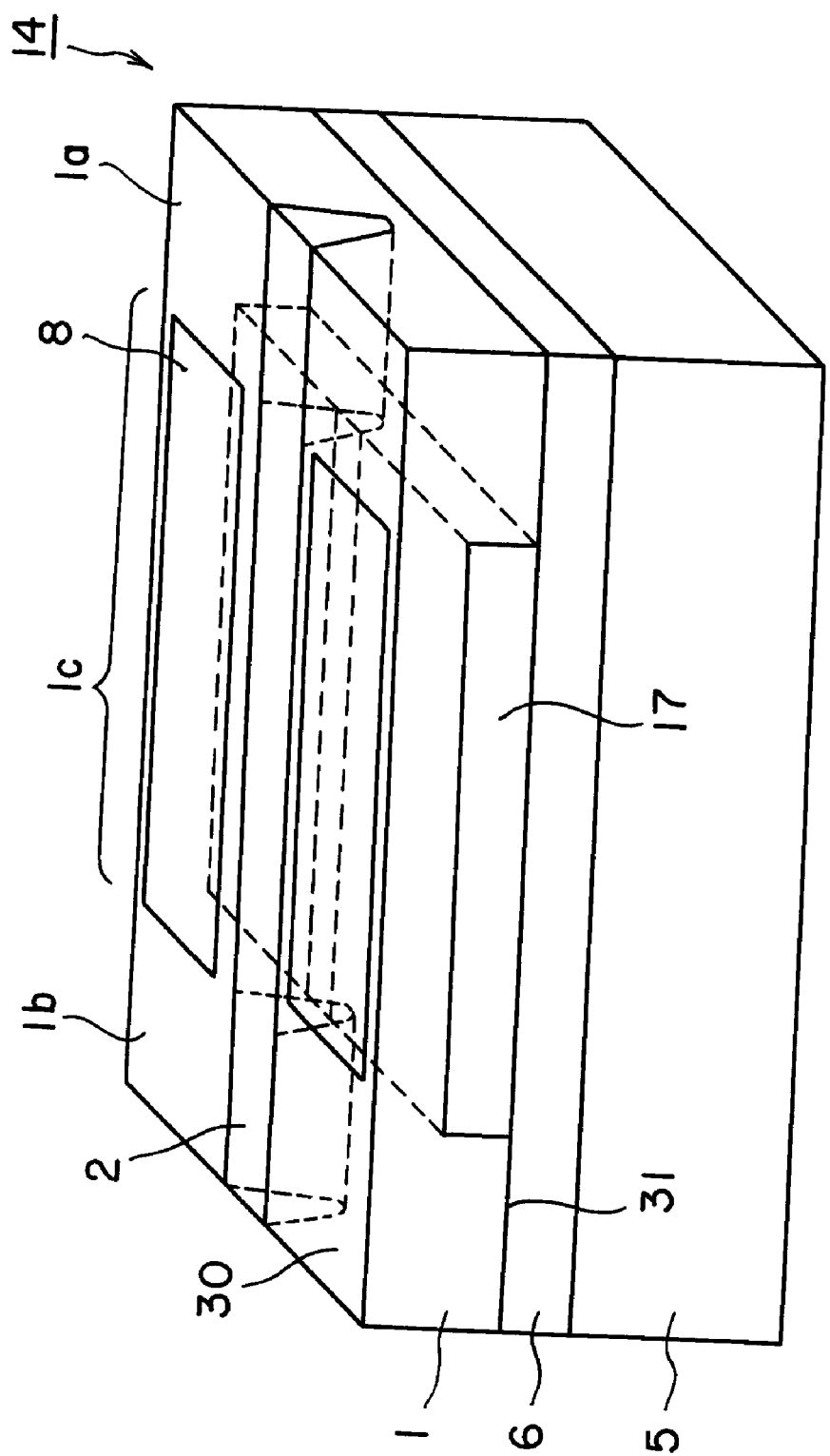
FIG. 2 is a perspective view of a device 14 according to contrastive example 2.

FIG. 2 is a perspective view of a device 14 according to contrastive example 2. In this example, a modulating substrate 1 is adhered onto the supporting substrate 5 via the adhesion layer 6. On first main surface 30 of the modulating substrate 1 (a top surface of the substrate 1 in FIG. 2), a straight optical waveguide 2 and a modulating electrode 8 are formed, for example. Toward an incident end surface of the optical waveguide 2, the core of the optical fiber is optically coupled. Likewise, toward an outgoing surface of the optical waveguide 2 as well, the core of the optical fiber is optically coupled.

In such a structure, a recess 17 is provided on a second main surface 31 of the modulating substrate 1 (a bottom surface of the substrate 1 in FIG. 2), whereby the thickness of the high-frequency interaction portion 1c is made smaller than the thicknesses of an incident portion 1a and an outgoing portion 1b.

In the optical modulator according to contrastive example 2, when velocity matching is made at the high-frequency interaction portion, for example with a thickness of 10 μm or smaller, of the modulating substrate 1, the light insertion loss caused between the modulator and the optical fiber can be reduced by making the thicknesses of the incident portion and the outgoing portion larger than the thickness of the interaction portion. However, since there are variations in adhesivity between the modulating substrate 1 and the supporting substrate 5, stresses concentrate at the step portions of the ends of the groove 17, and therefore an increase in the light insertion loss and a deterioration in the extinction ratio may occur after subjecting the device to a number of temperature cycles.

Figure 3:
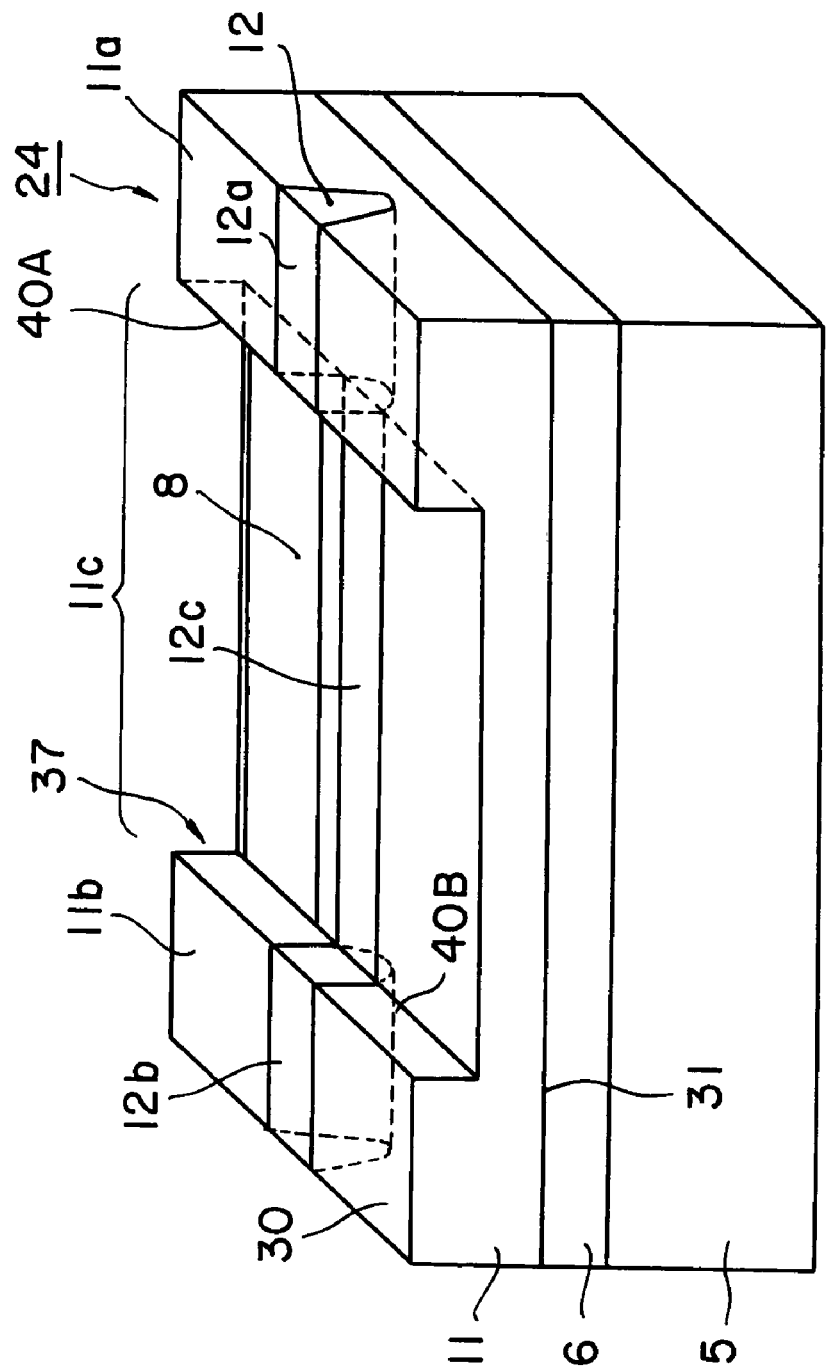
FIG. 3 is a perspective view of an optical modulator 24 according to an embodiment of the present invention.

FIG. 3 is a perspective view of an optical modulator 24 according to an embodiment of the present invention. In this embodiment, a modulating substrate 11 is adhered onto the supporting substrate 5 via the adhesion layer 6. On the first main surface 30 of the modulating substrate 11 (a top surface of the substrate 11 in FIG. 3), a straight optical waveguide 12 and a modulating electrode 8 are formed, for example. Toward an incident end surface of the optical waveguide 12, the core of the optical fiber is optically coupled. Likewise, toward an outgoing surface of the optical waveguide 12 as well, the core of the optical fiber is optically coupled.

In this embodiment, no recess is provided on the second main surface 31 of the modulating substrate 11, and the second main surface 31 is entirely flattened from the incident end surface to the outgoing end surface of the device. In addition, on the first main surface 30 of the modulating substrate 11 (the top surface of the substrate 11 in FIG. 3), a recess 37 is provided. Accordingly, the thickness of the high-frequency interaction portion 11c is made smaller than those of an incident portion 11a and an outgoing portion 11b. Therefore, the mode field diameter of the interaction portion 12c of the optical waveguide 12 is smaller than the mode field diameters of the incident portion 12a and the outgoing portion 12b.

In the optical modulator 24 according to the embodiment, when velocity matching is made at the high-frequency interaction portion 11c, for example with a thickness of 10 μm or smaller, of the modulating substrate 11, the light insertion loss caused between the modulator and the optical fiber can be reduced by making the thicknesses of the incident portion 11a and the outgoing portion 11b larger than the thickness of the interaction portion 11c. Furthermore, since there are no variations in adhesivity between the modulating substrate 11 and the supporting substrate 5, stress concentration on a part of the substrate is not created, so that an increase in the light insertion loss and a deterioration in extinction ratio can be suppressed even after the modulator 24 is subjected to a number of temperature cycles.

Moreover, in this embodiment, a step 40A is provided between the incident portion 11a and the interaction portion 11c, and a step 40B is provided between the outgoing portion 11b and the interaction portion 11c. In this way, when the steps are provided between the incident portion and the interaction portion and between the outgoing portion and the interaction portion, there is an advantage that the recess 37 can be easily formed by processing.

Figure 4:
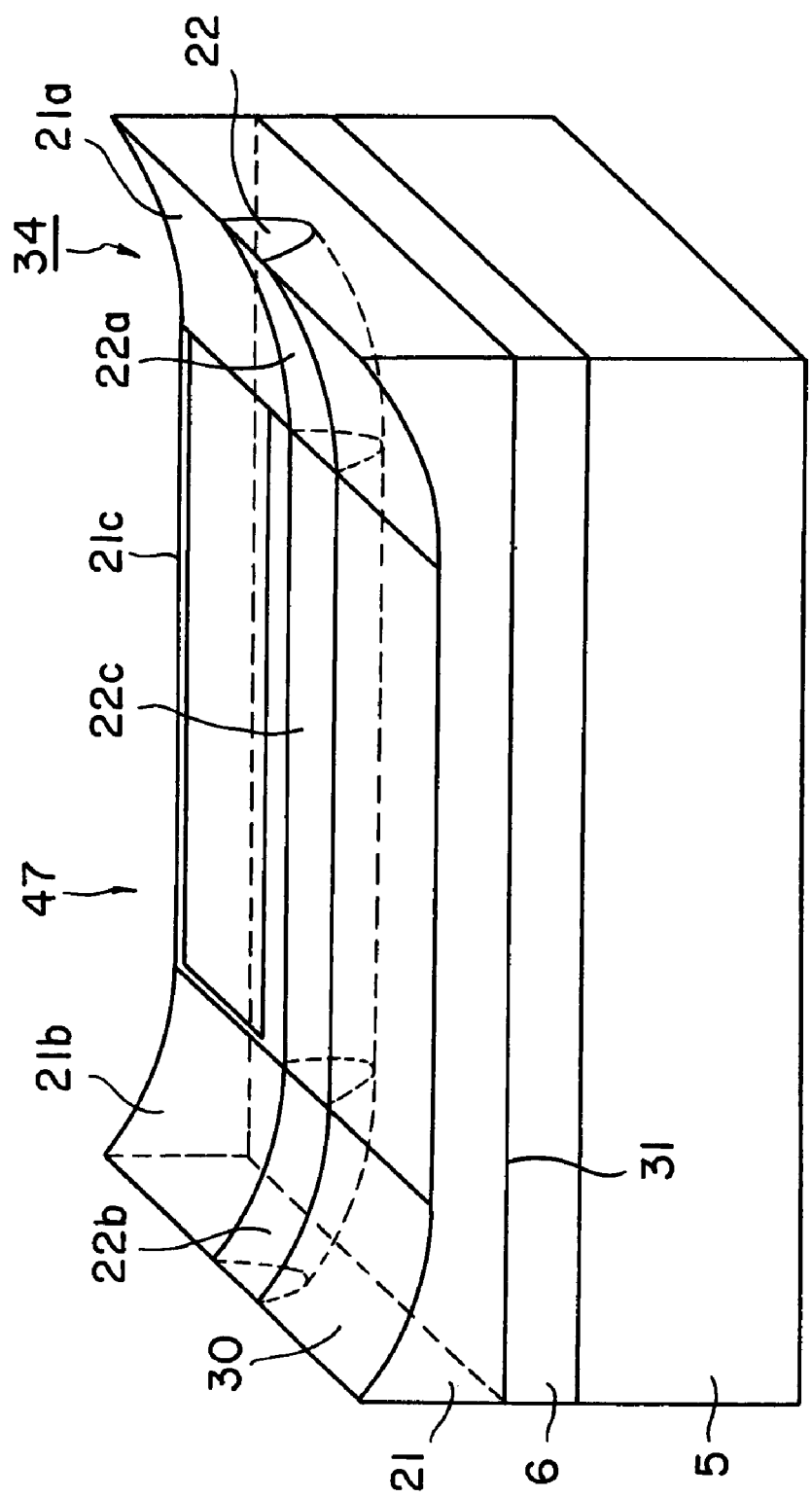
FIG. 4 is a perspective view of an optical modulator 34 according to another embodiment of the invention.

FIG. 4 is a perspective view of an optical modulator 34 according to another embodiment of the invention. In this embodiment, a modulating substrate 21 is adhered onto the supporting substrate 5 via the adhesion layer 6. On the first main surface 30 of the modulating substrate 21, a straight optical waveguide 22 and the modulating electrode 8 are formed, for example. In this embodiment, no recess is provided on the second main surface 31 of the modulating substrate 21, and the second main surface 31 is entirely flattened from the incident end surface to the outgoing end surface of the device. In addition, on the first main surface 30 of the modulating substrate 21, a recess 47 is provided. Accordingly, the thickness of a high-frequency interaction portion 21c is made smaller than the thicknesses of an incident portion 21a and an outgoing portion 21b.

In this embodiment, however, no step is provided between the high-frequency interaction portion 21c and the incident portion 21a and between the high-frequency interaction portion 21c and the outgoing portion 21b. Instead, the top surfaces of the incident portion 21a and the outgoing portion 21b are formed in smoothly tapered or curved surfaces. Therefore, the thickness of the incident portion 21a is decreased gradually from the end of the device to the interaction portion 21c, and the thickness of the outgoing portion 21b is decreased gradually from the end of the device to the interaction portion 21c.

According to this embodiment, the depth of the diffused portion of the optical waveguide 22 is designed to be constant throughout the length of the substrate. And further, in this case as well, since the thickness of the substrate is changed, the mode field diameter of an incident portion 22a of the optical waveguide 22 is decreased gradually from the end of the device to an interaction portion 22c; the mode field diameter of an outgoing portion 22b is decreased gradually from the end of the device to the interaction portion 22c.

In the optical modulator 34 according to the embodiment, when velocity matching is made at the interaction portion 21c, for example with a thickness of 10 μm or smaller, of the modulating substrate 21, the light insertion loss caused between the modulator 34 and the optical fiber can be reduced by making the thicknesses of the incident portion 21a and the outgoing portion 21b larger than the thickness of the interaction portion 21c. And further, since there are no variations in adhesivity between the modulating substrate 21 and the supporting substrate 5, an increase in the light insertion loss and a deterioration in the extinction ratio can be suppressed even after the modulator is subjected to a number of temperature cycles.

In addition, the surface 30 of the incident portion 22a and the outgoing portion 22b is formed in a smoothly tapered surface from the ends to the interaction portion 22c. Consequently, stress concentrations on the boundary between the interaction portion 22c and the incident portion 22a and the boundary between the interaction portion 22c and the outgoing portion 22b can be relieved more effectively.

Figure 5:
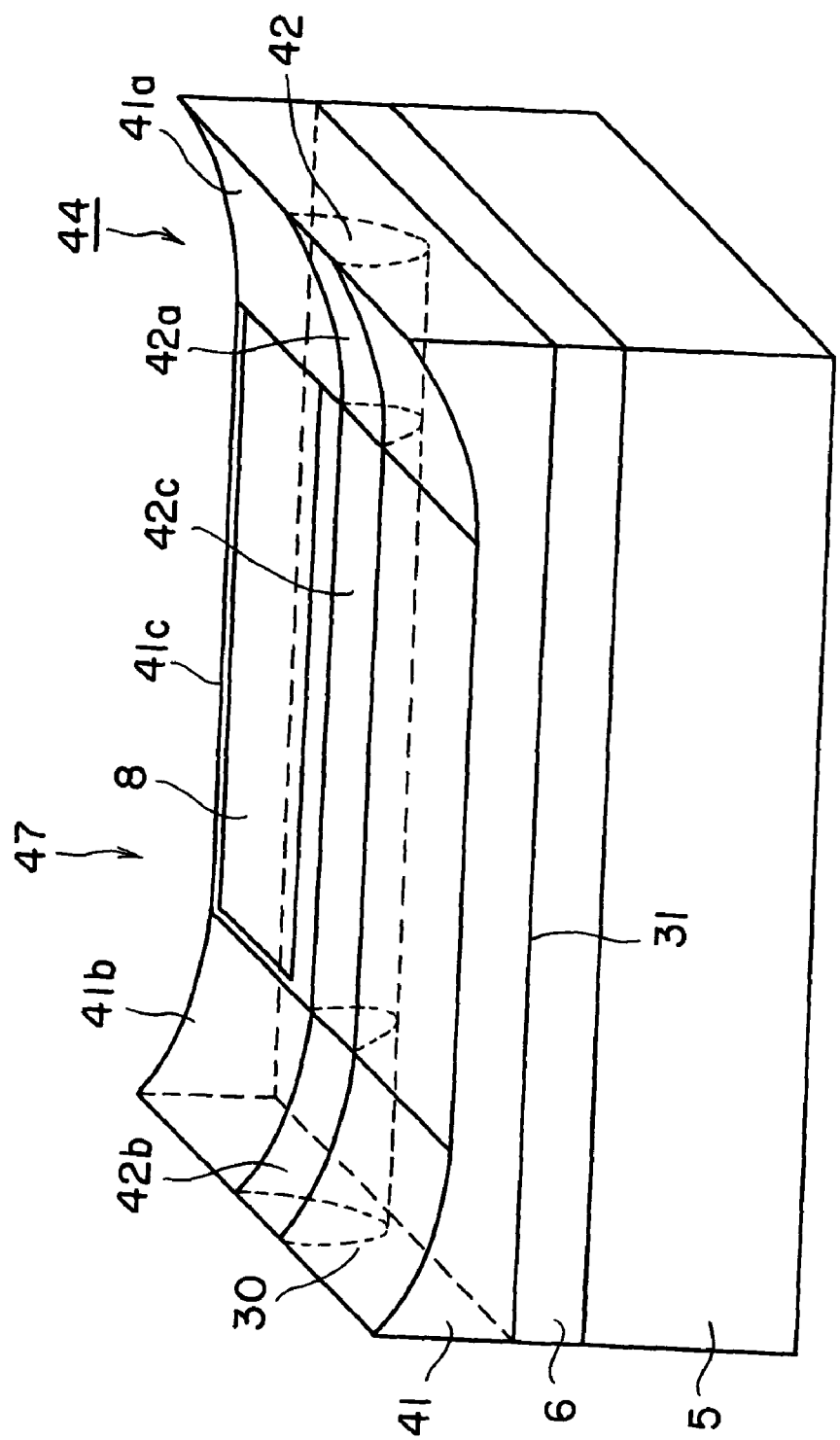
FIG. 5 is a perspective view of an optical modulator 44 according to another embodiment of the invention.

FIG. 5 is a perspective view of an optical modulator 44 according to another embodiment of the present invention. In this embodiment, a modulating substrate 41 is adhered onto the supporting substrate 5 via the adhesion layer 6. On the first main surface 30 of the modulating substrate 41, a straight optical waveguide 42 and the modulating electrode 8 are formed, for example. In this embodiment, no recess is provided on the second main surface 31 of the modulating substrate 41, and the second main surface 31 is entirely flattened from the incident end surface to the outgoing end surface. In addition, on the first main surface 30 of the modulating substrate 41, the recess 47 is provided. Accordingly, the thickness of an interaction portion 41c is made smaller than the thicknesses of an incident portion 41a and an outgoing portion 41b.

In this embodiment, as in the case of the modulator 34 of FIG. 4, a step is not provided between the interaction portion 41c and the incident portion 41a and between the interaction portion 41c and the outgoing portion 41b. Instead, the top surfaces of the incident portion 41a and the outgoing portion 41b are formed in smoothly tapered or curved surfaces. Thereby, the thickness of the incident portion 41a decreases gradually from the end of the device to the interaction portion 41c, and the thickness of the outgoing portion 41b decreases gradually from the end of the device to the interaction portion 41c.

According to the embodiment, the depth of the diffused portion of the optical waveguide 42 is also changed; that is, the depth of the diffused portion of an incident portion 42a is decreased gradually from the end of the device to an interaction portion 42c, and the depth of the diffused portion of the outgoing portion 42b is decreased gradually from the end of the device to the interaction portion 42c. In this case as well, the mode field diameter of the incident portion 42a is decreased gradually from the end of the device to the interaction portion 42c; the mode field diameter of the outgoing portion 42b is decreased gradually from the end of the device to the interaction portion 42c. In this embodiment, by decreasing the thickness of the substrate toward the interaction portion and also decreasing the thickness of the diffused portion of the optical waveguide toward the interaction portion, as shown in FIG. 4, the change in the mode field diameter is made to a larger extent.

Both to the light incident portion and the light outgoing portion of the modulating substrate, the optical fiber can be pigtail-spliced directly; or alternatively, the optical fiber can be coupled to the optical waveguide of each coupling part by means of lens coupling. In both above cases, the optical fiber propagating light is connected to the modulating substrate.

The difference in thickness between the interaction portion and the incident portion and that between the interaction portion and the outgoing portion are preferably not smaller than 0.5 μm, more preferably not smaller than 2 μm, and most preferably not smaller than 4 μm, in terms of the effect of the invention. It should be noted that, as the thicknesses of the interaction portion, the incident portion, and the outgoing portion, the maximum thicknesses of the respective portions are used.

Moreover, by setting the difference in thickness between the interaction portion and the incident portion and that between the interaction portion and the outgoing portion at not larger than 20 μm, the optical insertion losses caused by the differences in the mode field diameters can be further reduced; from this point of view, it is more preferable to set the difference in thickness between the interaction portion and the incident portion and that between the interaction portion and the outgoing portion at not larger than 10 μm.

Furthermore, from the viewpoints of characteristic impedance matching and velocity matching between light waves and microwaves, the thickness of the interaction portion is preferably not larger than 10 μm, more preferably not larger than 8 μm, and further preferably not larger than 5 μm.

The thickness of the supporting substrate is not limited particularly; from the viewpoint of the handling of the part, the thickness is preferably not smaller than 100 μm, more preferably not smaller than 500 μm.

The thickness of the adhesion layer 6 is not limited particularly; from the viewpoint of velocity matching between light waves and microwaves, the thickness is preferably not smaller than 10 μm. Further, from the viewpoint of the stress relief caused by a difference in linear expansion coefficients at each coupling portion, the thickness is preferably not larger than 1000 μm, more preferably not larger than 100 μm.

Furthermore, when the incident portion and the outgoing portion have smoothly tapered surfaces, concrete shapes thereof are not limited particularly; for example, the surfaces may be inclined flat surfaces or curved surfaces.

According to the present invention, the mode field diameter of the incident portion and outgoing portion of the optical waveguide is larger than that of the interaction portion of the optical waveguide. The difference in the mode field diameter is not limited but is preferably not smaller than 0.5 μm, more preferably not smaller than 2 μm.

The optical waveguide may be a ridge optical waveguide directly formed on the first main surface of the modulating substrate, a ridge optical waveguide formed on the first main surfaces of the modulating substrate via another layer, or an optical waveguide formed in the modulating substrate by means of an inner diffusion method or an ion exchange method such as a titanium-diffused optical waveguide or a proton-exchanged optical waveguide. In particular, the optical waveguide may be a ridge optical waveguide in which the optical wave guide protrudes from the surface of the substrate. The ridge optical waveguide can be formed by means of laser processing or machining; alternatively, a three-dimensional ridge optical waveguide can be formed by forming a high-refractive-index film on the substrate and then subjecting the film to machining or laser ablation. The high-refractive-index film can be formed by means of, for example, a chemical vapor deposition method, a physical vapor deposition method, a metal organic chemical vapor deposition method, a sputtering method, or a liquid phase epitaxial method.

In the foregoing embodiments, the electrode is provided on the surface of the modulating substrate, and may be directly formed on the surface of the modulating substrate, or may be formed on a low dielectric layer or a buffer layer. The low dielectric layer can be formed of a known material such as silicon oxide, magnesium fluoride, silicon nitride, alumina, or the like. The term "low dielectric layer" as used herein refers to a layer formed of a material with a lower dielectric constant than a material constituting the substrate body.

The modulating substrate is constituted of a ferroelectric electro-optical material, preferably the single crystal. Such a crystalline material is not particularly limited provided that light can be modulated; for example, lithium niobate crystal, lithium tantalate crystal, lithium niobate-lithium tantalate solid solution, potassium-lithium niobate crystal, KTP crystal, GaAs crystal, or quartz crystal can be exemplified.

Examples of a material for the supporting substrate may be a glass such as quartz glass in addition to the above ferroelectric electro-optical materials.

The adhesive for bonding the modulating substrate, the connecting substrate, and the supporting substrate together is made of a material with a lower dielectric constant than the material constituting the modulating substrate. Concrete examples of the material are not particularly limited as long as the above condition is satisfied; for example, an epoxy adhesive, a heat-hardening adhesive, an ultraviolet-curing adhesive, or Aron Ceramics C (Tradename) from Toa Gosei Co., Ltd (thermal expansion coefficient: $13\times10^{-6}$/K) can be exemplified.

As examples of a method for forming the recess in the modulating substrate, fluorine reactive ion etching (RIE), surface grinding, and sand blasting can be exemplified.

In the foregoing embodiments, the cases where the invention is applied to the amplitude modulator have been described; furthermore, the invention is applicable to a phase modulator in which the optical waveguide arrangement is different.

EXAMPLES

Example 1

FIG. 3

The optical modulator 24 of FIG. 3 was produced. Specifically, a Ti film 800 Å thick and 4 μm wide was formed on an X-cut LN (lithium niobate single crystal) wafer, and the wafer was subjected to thermal diffusion to form the optical waveguide 12. Then, in order to form the recess 37 on the surface on which the modulating electrode 8 is to be formed, about 5 μm depth steps 40A and 40B were provided on the surface beforehand by using a fluorine reactive ion etching (RIE) apparatus. Thereafter, the electrode pattern 8 was formed in the recess 37. It has been confirmed that the recess can also be formed by using a surface grinder or a sandblaster.

Next, as a step of thinning the LN substrate, the wafer with the optical waveguide was adhered onto a polishing surface plate, and the undersurface of the wafer was ground by means of grinding until the thickness of the interaction portion 11c was reduced to 5 μm. Then, the low dielectric adhesive 6 with a thickness of 50 μm was applied to the undersurface of the LN substrate, following which the reinforcing LN substrate 5 was adhered to the adhesion layer to make a thin optical modulator. Thereafter, the resulting modulator was cut into chips, and then the end surfaces of the chips were polished to produce the optical modulator chip 24.

As a result of evaluating the high frequency characteristics of the interaction portion 11c of each chip, a microwave effective refractive index was 2.2, and therefore it was confirmed that the velocity matching condition is satisfied. After the optical fiber was coupled to the LN optical modulator chip, the chip was mounted into a package, and then the light insertion loss was evaluated. In the structure of contrastive example 1 (FIG. 1), the excess loss of light coupling due to the difference between spot sizes was −2.5 dB (one side); while in the modulator according to example 1, the excess loss was reduced to −0.9 dB.

Figure 8:
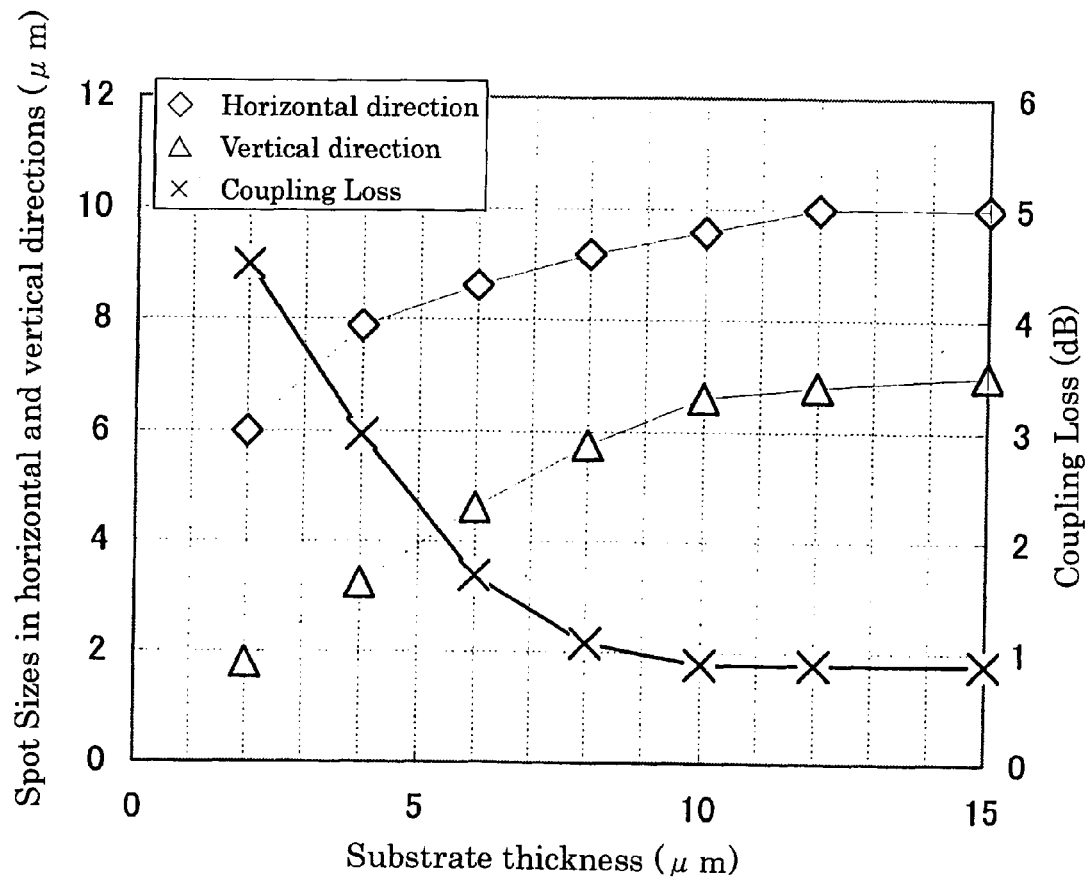
FIG. 8 is a graph showing the relationship between the thicknesses of LN substrates, spot sizes in horizontal and vertical directions, and coupling losses.

FIG. 8 is a graph showing the relationship between the thicknesses of the substrates, spot sizes in horizontal and vertical directions, and coupling losses. From these measurement results, it can be seen that when the substrate thickness is not larger than 12 μm, the spot sizes in both the horizontal and vertical directions decrease by reducing the substrate thickness, and when the substrate thickness is from 10 to 15 μm, the coupling loss relative to the optical fiber takes the minimum value. And further, it can be seen that when the substrate thickness is not larger than 15 μm, the spot sizes depend on the substrate thickness within the range of the Ti thickness of 400 to 1000 Å.

Figure 6:
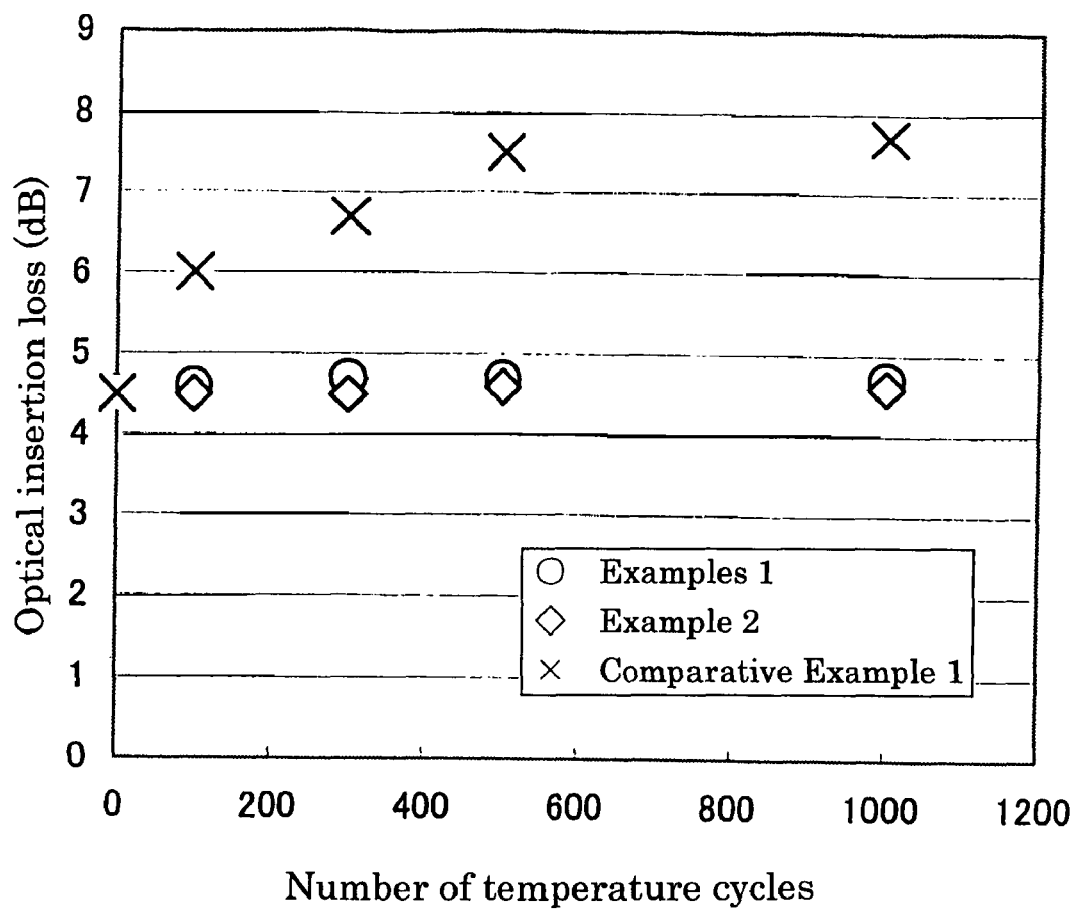
FIG. 6 is a graph showing light insertion losses after temperature cycles.
Figure 7:
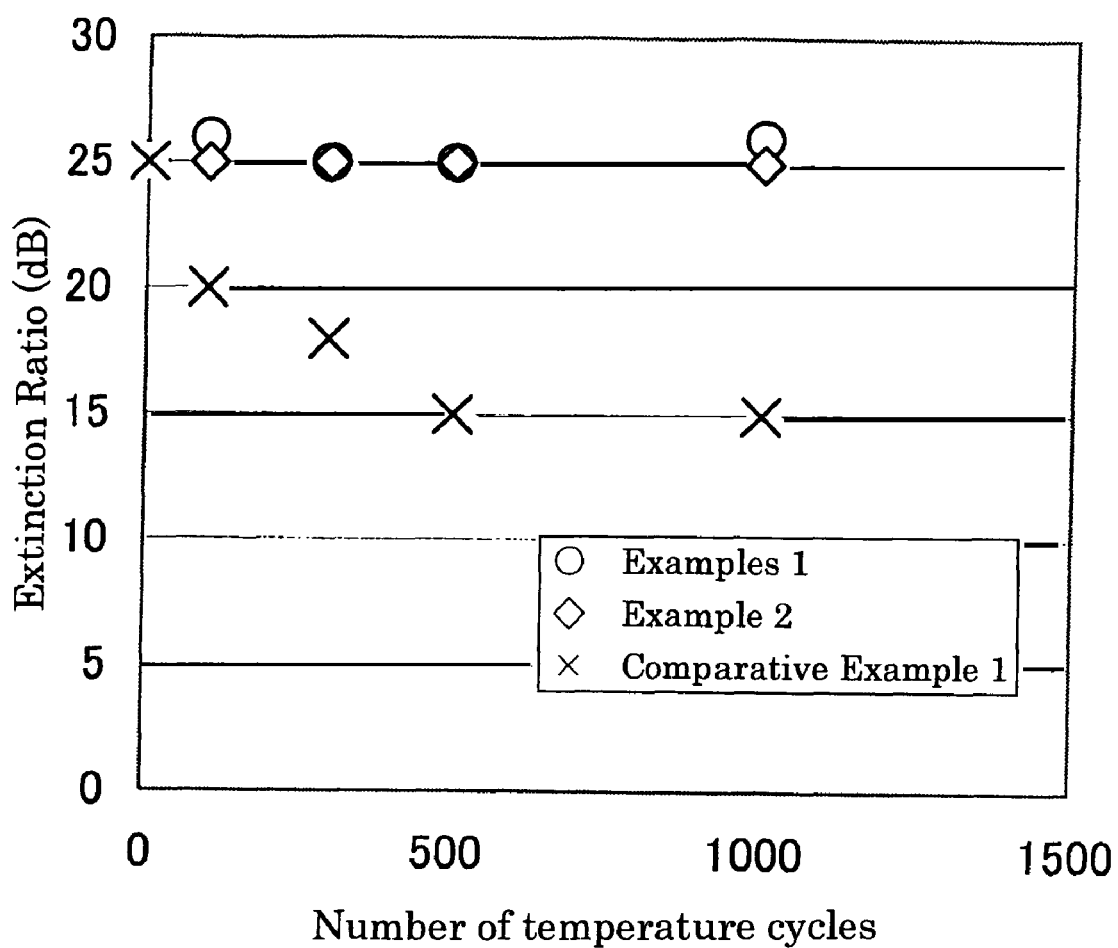
FIG. 7 is a graph showing extinction ratios after the temperature cycle tests.

Next, 11 modulation devices were produced, and then each device was subjected to temperature cycle tests over the temperature range of −40 to 85° C. in 500 times. The results of the tests are presented in FIGS. 6 and 7. Even after 500 temperature cycle tests, the light insertion loss and the extinction ratio hardly deteriorated; therefore it has been confirmed that there is no problem with the reliability.

TABLE 1

| | Optical Insertion loss | | |
|---|---|---|---|
| Number of tests of Temperature cycles | Example 1 (FIG. 3) | Example 2 (FIG. 4) | Comparative Example 1 (FIG. 2) |
| 0 | 4.5 | 4.5 | 4.5 |
| 100 | 4.6 | 4.5 | 6 |
| 300 | 4.7 | 4.5 | 6.7 |
| 500 | 4.7 | 4.6 | 7.5 |
| 1000 | 4.7 | 4.6 | 7.7 |

TABLE 2

| | Extinction Ratio | | |
|---|---|---|---|
| Number of tests of Temperature cycles | Example 1 (FIG. 3) | Example 2 (FIG. 4) | Comparative Example 1 (FIG. 2) |
| 0 | 25 | 25 | 25 |
| 100 | 26 | 25 | 20 |
| 300 | 25 | 25 | 18 |
| 500 | 25 | 25 | 15 |
| 1000 | 26 | 25 | 15 |

Example 2

FIG. 4

As in example 1, a Ti-diffused optical waveguide was formed in an X-cut LN wafer. Then, as a step of thinning the LN substrate, the wafer with the optical waveguide was adhered onto a polishing surface plate, and the undersurface of the wafer was ground. At that time, the grinding was performed such that the wafer was tapered with increasing the thickness toward the both ends thereof having 10 µm thickness while the central portion thereof, in which a modulating electrode is formed, keeps the thickness about 5 µm. Thereafter, an electrode pattern was formed at the 5-µm-thick portion. Then a low dielectric adhesive was applied onto the undersurface of the LN substrate such that the thickness of the modulating electrode becomes 50 µm, and a reinforcing LN substrate was adhered thereto, whereby a thin optical modulator was produced. After that, the resulting modulator was cut into chips, and the end surfaces of the chips were polished to produce the LN optical modulator chip of FIG. 4.

After the optical fiber was coupled to the LN optical modulator chip, the chip was mounted into a package, and then the light insertion loss was evaluated.

In the structure according to example 2, as in example 1, the excess loss of light coupling was −0.9 dB. Further, as in example 1, it has been found that light alignment can be easily made as compared with comparative examples, there is no need to form an antireflection film on each end surface, and the light return loss is not higher than −30 dB.

Next, 11 modulator devices were produced, and then each device was subjected to temperature cycle tests over the temperature range of −40 to 85° C. in 500 times. The results of the tests are presented in FIGS. 6 and 7. Even after 500 temperature cycle tests, the light insertion loss and the extinction ratio hardly deteriorated; therefore it has been confirmed that there is no problem with the reliability.

Example 3

FIG. 4

As in example 1, a Ti-diffused optical waveguide was formed in an X-cut LN wafer. Thereafter, the electrode pattern was formed on the surface with the optical waveguide formed therein. Then, as a step of thinning the LN substrate, the wafer with the optical waveguide was adhered onto a polishing surface plate, and the undersurface of the wafer was ground. At that time, the grinding was performed such that the wafer was tapered with increasing the thickness toward the both ends thereof having 10 µm thickness while the central portion thereof, in which a modulating electrode is formed, keeps the thickness about 5 µm. Then a low dielectric adhesive was applied onto the undersurface of the LN substrate such that the thickness of the modulating electrode becomes 50 µm, and a reinforcing LN substrate was adhered thereto, whereby a thin optical modulator was produced. After that, the resulting modulator was cut into chips, and the end surfaces of the chips were polished to produce the LN optical modulator chip of FIG. 4.

After the optical fiber was coupled to the LN optical modulator chip, the chip was mounted into a package, and then the light insertion loss was evaluated.

In the thus obtained structure, as in example 1, the excess loss of light coupling was −0.9 dB. Further, as in example 1, it has been found that light alignment can be easily made as compared with comparative examples, there is no need to form an antireflection film on each end surface, and the light return loss is not higher than −30 dB.

Comparative Example 1

FIG. 2

A Ti-diffused optical waveguide and a modulating electrode were formed in an X-cut LN wafer to make an optical modulator wafer. Next, as a step of thinning the LN substrate, the LN modulator wafer was initially adhered onto a polishing surface plate, and then the undersurface of the wafer was ground by means of grinding until the thickness thereof was reduced to 10 µm. Then, the wafer was ground by using a microgrinder so as to provide a recess on the lower side of the driving portion of the modulator, which is step with the only central portion having a thickness of about 5 µm.

Thereafter, a low dielectric adhesive with a thickness of 50 µm was applied onto the undersurface of the thus processed LN substrate with the electrode pattern, and a reinforcing LN substrate was adhered thereto to produce a thin optical modulator substrate. Then, the resulting substrate was cut into chips, and the end surfaces of the chips were polished, whereby the LN optical modulator chip was produced (see FIG. 2).

After the optical fiber was coupled to the LN optical modulator chip, the chip was mounted into a package, and then the light insertion loss was evaluated. In the structure according to comparative example 1, as in example 1, the excess loss of light coupling was −0.9 dB. Moreover, as in example 1, it has been found that light alignment can be easily made, there is no need to form an antireflection film on each end surface, and the light return loss is not higher than −30 dB.

Eleven devices were produced, and then each device was subjected to temperature cycle tests over the temperature range of −40 to 85° C. in 500 times. The results of the tests are presented in FIGS. 6 and 7. It can be seen that even after 100 temperature cycle tests, the light insertion loss is increased and the extinction ratio is deteriorated. As a result of performing a stress analysis to find the cause of the above phenomena. It has been found that when the electrode is on the groove-formed surface as in examples 1 and 2, the maximum stress exerted on the substrate is not greater than 60 MPa, while when the electrode is on the opposite side of the groove-formed surface as in comparative example 1, the maximum stress exerted on the substrate is greater than 100 MPa. From the above facts, it has been found that since microcracks occur due to stress concentration on the optical waveguide portion, the light insertion loss and the extinction ratio are deteriorated.

Comparative Example 2

FIG. 1

The LN optical modulator chip 4 of FIG. 1 was produced by using the same process as that described in comparative example 1, except that the lower side of the driving portion of the optical modulator was formed in a flat shape without having recess. After the optical fiber was coupled to the LN optical modulator chip, the chip was mounted into a package, and then the light insertion loss was evaluated; the loss was −2.5 dB.

In comparative example 2, the light-confining function in a vertical direction (thickness direction of the substrate) of the titanium-diffused waveguide depends on the thickness of the thinned optical waveguide substrate. It has been found that since there is a large difference between the substrate thickness of about 5 microns and the spot diameter of the optical fiber of 10 microns, the coupling loss as high as −2.5 dB occurs by actual measurement.

The vertical light-confining function of the optical waveguide according to the examples of the present invention has high flexibility since there are two design parameters: (1) the thickness of the optical fiber connecting portion of the optical waveguide substrate; and (2) the titanium diffusion condition (the width of the titanium diffusion, the thickness of the titanium layer, or the like). It becomes thus easier to bring the level of the confinement into correspondence with the spot size, i.e., the diameter of 10 microns, of the optical fiber.

Comparative Example 3

FIG. 9

Figure 9:
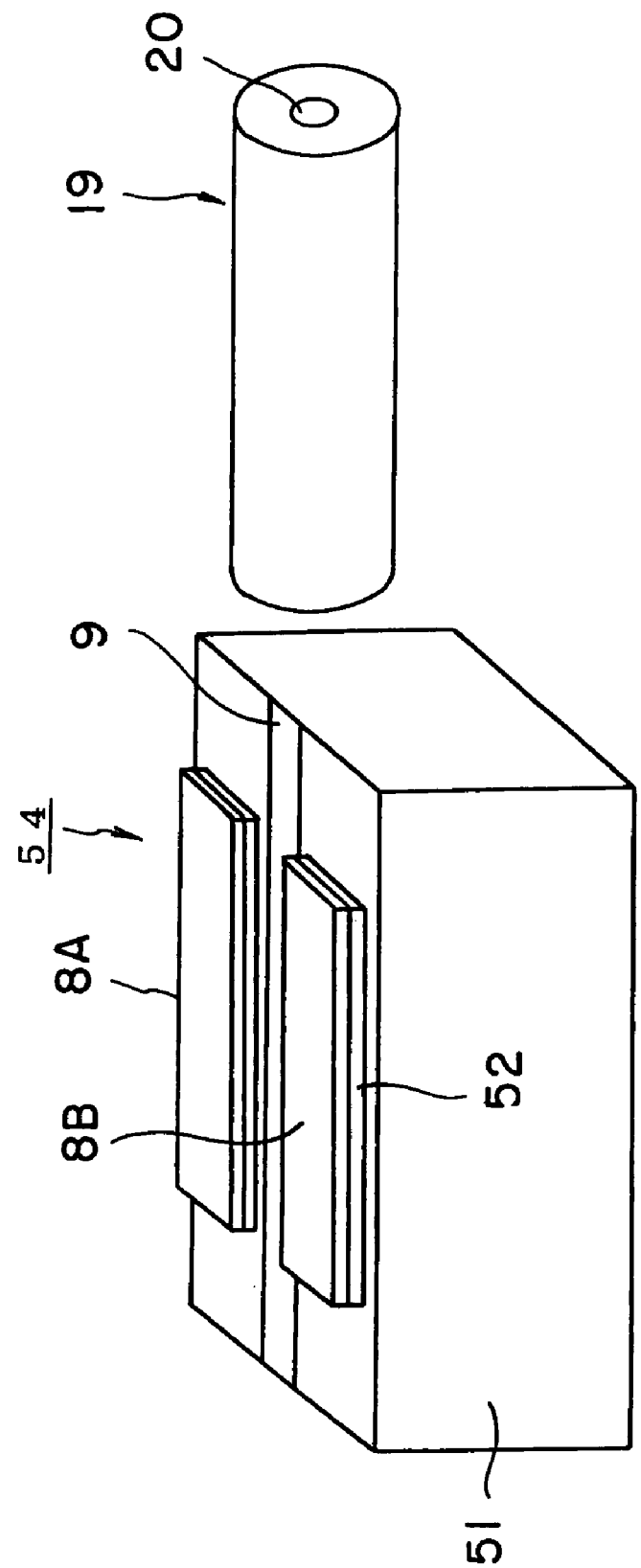
FIG. 9 is a schematic diagram of an optical modulator chip 54 and an optical fiber 19 according to a comparative example.

An optical modulator 54 having a structure illustrated in FIG. 9 was produced. It is noted that a substrate 51 is a 500-μm-thick X-cut plate of a lithium niobate single crystal. An $SiO_2$ buffer layer was formed on the substrate 51 and electrodes 8A and 8B were formed on the buffer layer. This example is one embodiment in which velocity matching was made by forming the buffer layer 52 on the surface of the thick optical modulator substrate.

After an optical fiber 19 was coupled to the LN optical modulator chip 54, the chip was mounted into a package, and then the light insertion loss was evaluated; the loss was −1.5 dB.

That is, in this thick LN optical modulator, the light confinement function is controlled with only a titanium diffusion condition (the width of titanium diffusion, the thickness of the titanium layer, or the like) and is thus inferior in flexibility to that of the modulators according to the invention. This is because the LN layer is sufficiently thick, optical waveguide confinement due to the thickness of the LN layer cannot be expected, and thus the thickness cannot be the design parameter. However, in even this comparative example, the coupling loss was better when compared with that caused in the optical modulator of FIG. 1 according to comparative example 2.

(Relationship Between Ti Line Width, Spot Size and Coupling Loss with Fiber)

Figure 10:
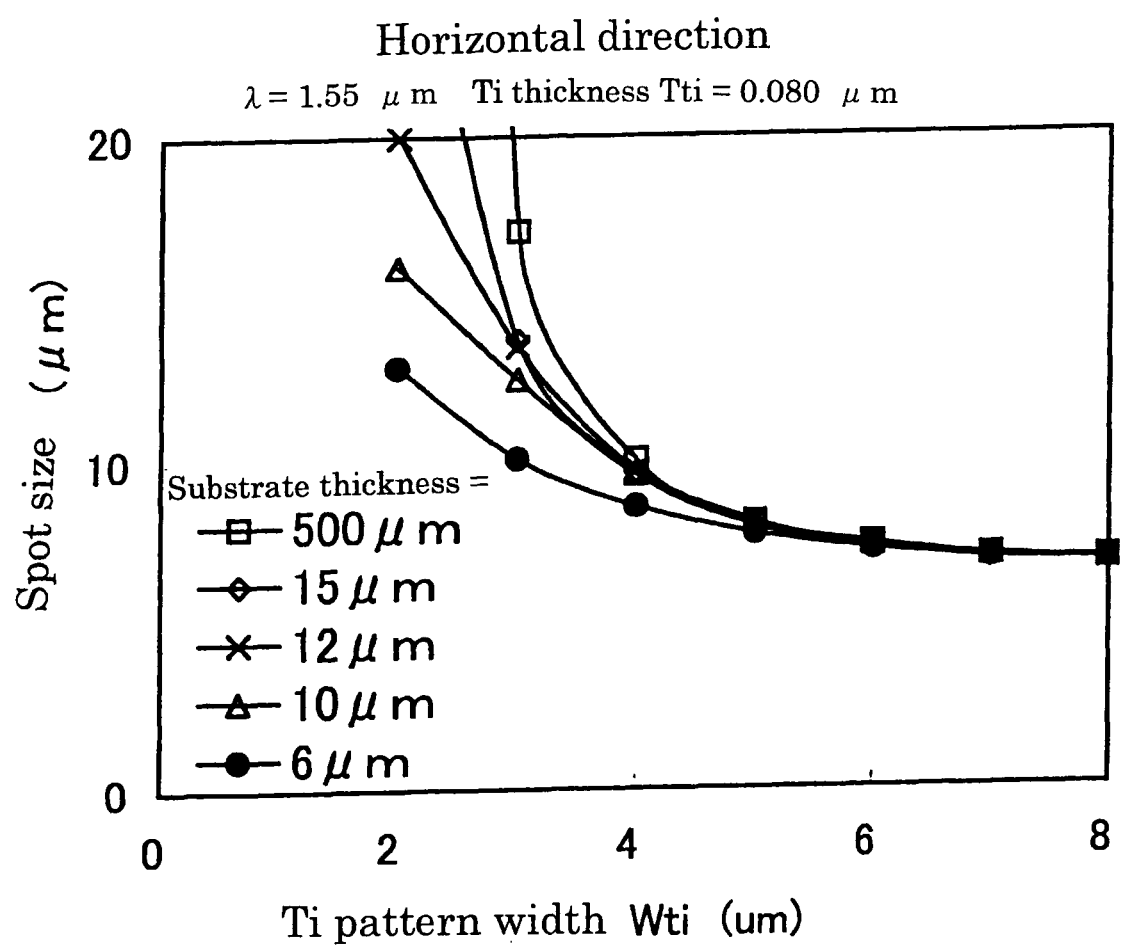
FIG. 10 is a graph showing the dependency of spot size (horizontal direction) on Ti width in example 3 and comparative example 2.
Figure 11:
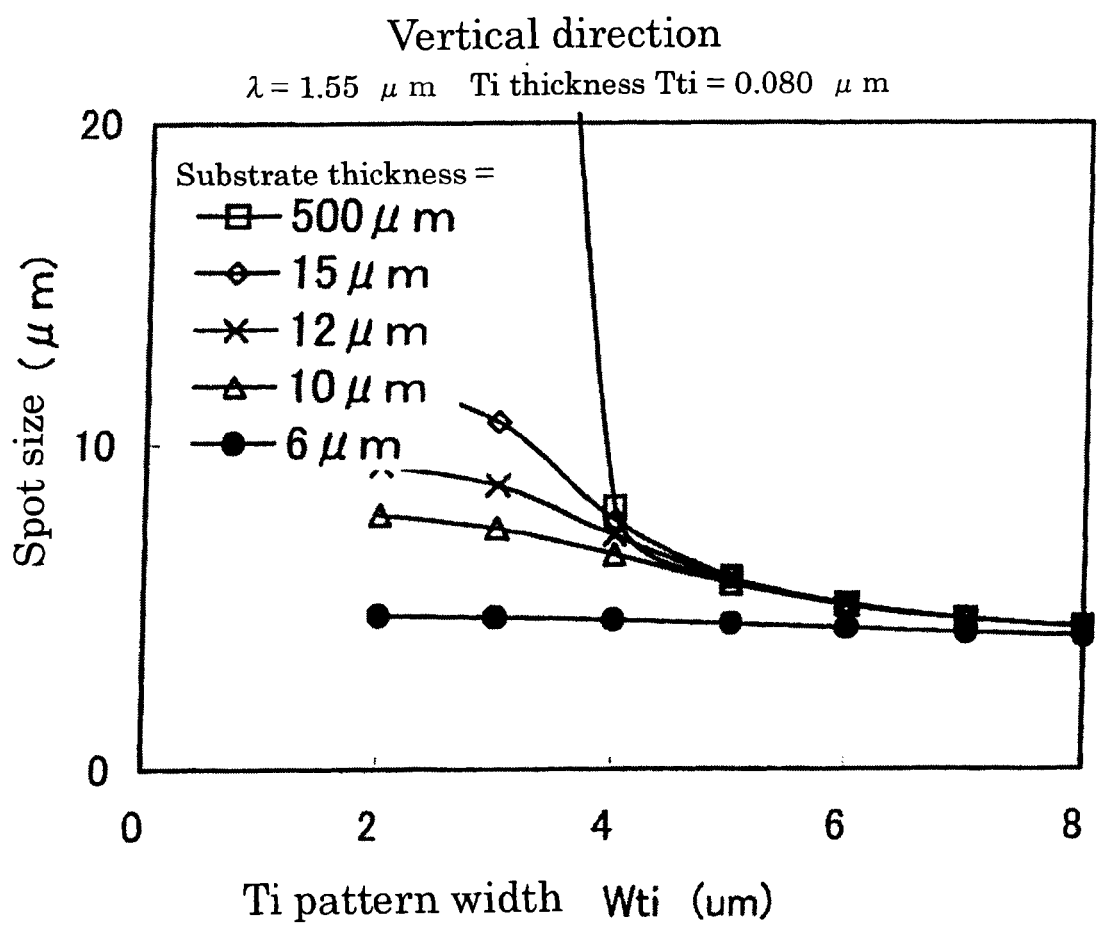
FIG. 11 is a graph showing the dependency of spot size (vertical direction) on Ti width in example 3 and comparative example 2.

FIGS. 10 and 11 show experimental results of the dependency of spot size of light on the Ti line width, in the structures shown in the example 3 (FIG. 4) and comparative example 2 (FIG. 9). The thickness of Ti is 0.08 μm. As a result, when the substrate is sufficiently thick, the Ti width of 4 μm or smaller results in cut-off state to propagate light. It is proved that the substrate thickness of 20 μm or smaller results in a shift of the cut-off point so that the propagation mode can be obtained to a Ti width of 2.5 μm.

Further, concerning the coupling loss with an optical fiber, reflecting the spot size, it is possible to reduce the coupling loss with respect to the structure using sufficiently large substrate thickness of the example 2, by adjusting the Ti line width in a range of 2.5 to 7 μm.

Figure 12:
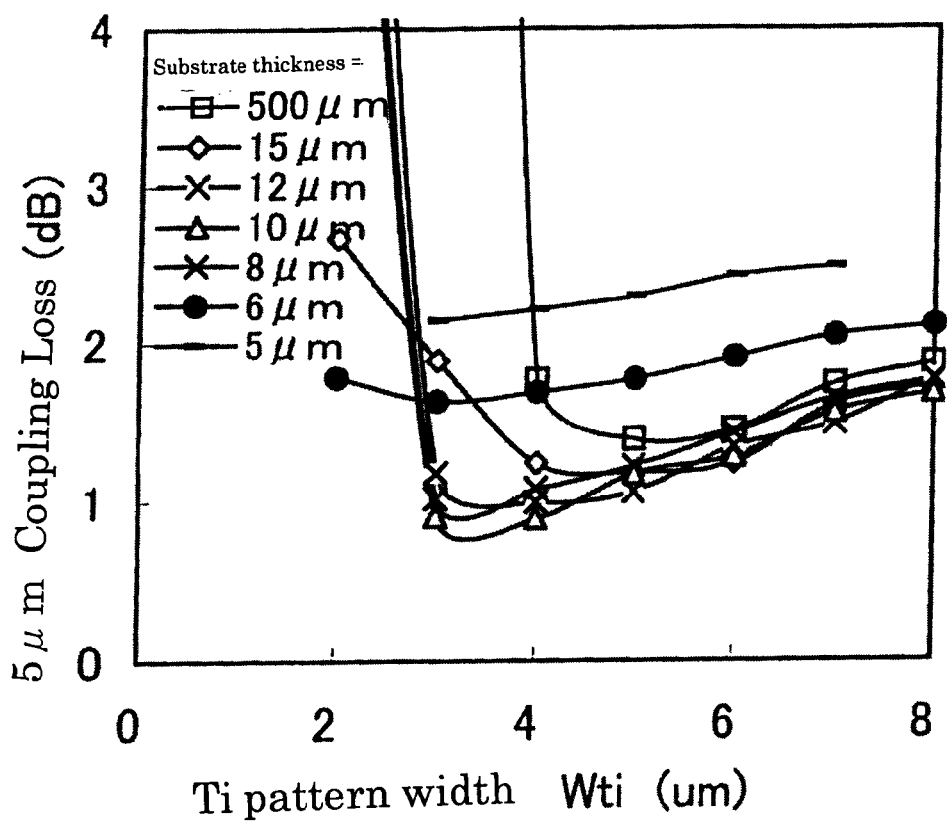
FIG. 12 is a graph showing the dependency of coupling loss with an optical fiber on Ti width in example 3 and comparative example 2.

Similar results are obtained in the range of Ti thickness of 700 angstrom (0.07 μm) to 1100 angstrom (0.11 μm). It is further proved that the Ti line width providing the minimum coupling loss of FIG. 12 is shifted to be a smaller value, by increasing the Ti thickness. For example, the coupling loss takes the minimum at a Ti line width of 2 μm at a Ti thickness of 1000 angstrom.

The invention claimed is:

1. An optical modulator comprising:
a supporting substrate;
a modulating substrate comprising an electro-optical material;
an optical waveguide provided on the side of a first main surface of the modulating substrate; and
an adhesion layer adhering a second main surface of the modulating substrate onto the supporting substrate,
wherein the modulating substrate comprises a high-frequency interaction portion applying a voltage on the optical waveguide to modulate propagating light, an incident portion inputting light to the optical waveguide and an outgoing portion outputting light from the optical waveguide;
wherein the high-frequency interaction portion is recessed on the side of the first main surface of the modulating substrate with respect to the incident and outgoing portions; and
wherein the high-frequency interaction portion has a thickness smaller than the thicknesses of the incident and outgoing portions.

2. The optical modulator of claim 1, wherein a step is provided between the high-frequency interaction portion and the incident portion.

3. The optical modulator of claim 1, wherein a step is provided between the high-frequency interaction portion and the outgoing portion.

4. The optical modulator of claim 1, wherein the first main surface of the modulating substrate is formed as a smoothly tapered surface in the incident portion.

5. The optical modulator of claim 1, wherein the first main surface of the modulating substrate is formed as a smoothly tapered surface in the outgoing portion.

6. The optical modulator of claim 1, wherein the thickness of the high-frequency interaction portion is not larger than 10 μm.

7. The optical modulator of claim 1, wherein the differences in thickness between the high-frequency interaction portion and the incident portion and between the high-frequency interaction portion and the outgoing portion are not smaller than 0.5 μm.

8. The optical modulator of claim 1, wherein the second main surface of the modulating substrate is flattened from the incident portion to the outgoing portion through the high-frequency interaction portion.

* * * * *